(No Model.)

C. COMSTOCK.
VEHICLE.

No. 480,421.   Patented Aug. 9, 1892.

Witnesses
Frank S. Davis
David S. Oliver

Inventor
Charles Comstock
By his Attorney

UNITED STATES PATENT OFFICE.

CHARLES COMSTOCK, OF INDIANAPOLIS, INDIANA.

VEHICLE.

SPECIFICATION forming part of Letters Patent No. 480,421, dated August 9, 1892.

Application filed May 11, 1891. Serial No. 392,256. (No model.)

*To all whom it may concern:*

Be it known that I, CHARLES COMSTOCK, a citizen of the United States, and a resident of Indianapolis, in the county of Marion and State of Indiana, have invented certain new and useful Improvements in Vehicles, of which the following is a specification.

My invention relates to an improvement in light spring-vehicles, and particularly to means for changing wagons of this class from a single-seat to a two-seat vehicle and, if desired, from a regular two-seat wagon to a dos-a-dos "drag."

Its object is to provide a stronger and more easily operated changeable seat and reversible back than those in common use at less cost.

With these objects in view my invention consists in the peculiar combination and arrangement of parts hereinafter described, and illustrated in the accompanying drawings.

Figure 1:
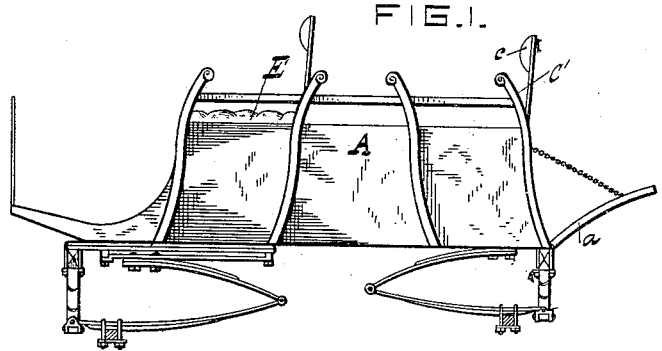
Figure 2:
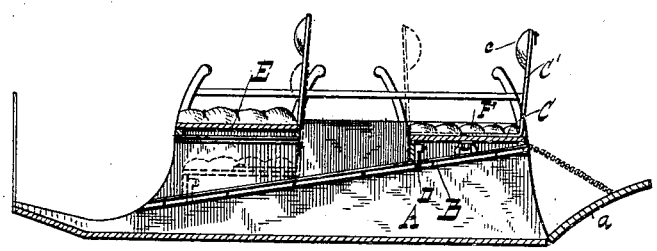
Figure 3:
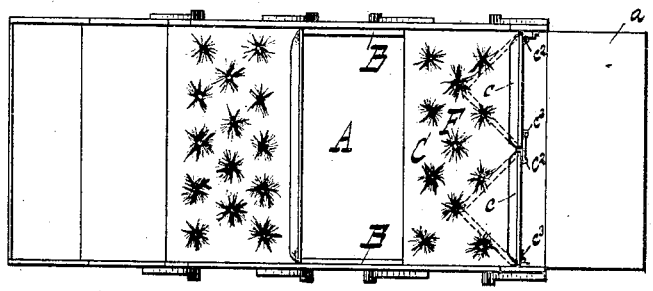
Figure 4:
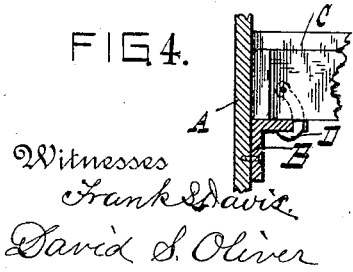
Figure 5:
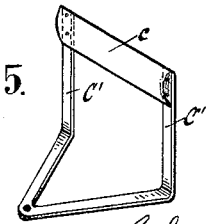

Referring to the drawings, in which like parts are indicated by similar reference-letters wherever they occur throughout the various views, Figure 1 is a side elevation of a vehicle embodying my invention. Fig. 2 is a longitudinal central vertical section of the same. Fig. 3 is a plan view. Fig. 4 is a detail view in transverse vertical section. Fig. 5 is a perspective view of the pivoted changeable back.

The body A may be made after any of the well-known patterns. I have selected one well-known form with a hinged tail-gate $a$, and chains to stop it in a position to form a foot-rest when the back of the rear seat is reversed to form a dos-a-dos.

To the inside of the body sides are secured in an inclined position the angle-iron bar B, upon which the rear seat C is supported. The frame of this seat is inclined upon the under side in the opposite direction from its supports, so that the top of the seat maintains a horizontal position wherever stopped upon the inclined bars B.

To stop the seat in any position desired, I provide a gravity-catch D, which is pivoted to the front of the seat upon one side, and notch the horizontal web of the angle-bar B at the point or points I desire to lock the seat. As seen in Fig. 2, it is notched to retain the seat at the rear end of the wagon-body. To change the vehicle to a single-seat wagon, it is only necessary to swing the catch inward to disengage it from its notch, when the seat C will slide underneath the front seat E, as shown in dotted lines, Fig. 2. In this position the back of the rear seat C comes midway between the back of the front seat and the cushion, thus furnishing an additional support for the back of the occupant when the vehicle is changed to a single-seat wagon. The catches D, hooking underneath the bars B, support the back in the upright position. The back of the rear seat is made in two parts, each part comprising the back-supporting irons C' and back rail $c$. The supporting-iron C' is made from an iron rod bent at a right angle and having its angle end formed into an eye or boss to receive the bolt by which it is secured upon the seat. The angle-legs extend to the rear of the seat and are then bent up to form the upright back rails, to the top of which the back $c$ is secured in the usual manner. To swing the seat-backs around, the cushion F is removed and replaced after the backs are in the position desired. The rear of the seat-backs $c$ near their ends are provided the one with staples $c^2$ and the other with hooks $c^3$ to hold the divided seat-back as one piece.

It is obvious that other forms of reversible seat-backs may be used with my sliding seat; but the one shown is especially adapted to it, as it occupies no more room than the ordinary non-reversible seat.

My body may be used upon any of the well-known gears. The one shown in Fig. 1 is of my own invention, but is not claimed herein, as I intend to make it the subject of a separate application.

I have shown iron angle-bars secured in an inclined position as the means for supporting the rear seat and acting as tracks to guide it under the front seat when released; but I do not limit myself to this specific arrangement, as the inclined ways may be of wood and of any form in cross-section desired. So long as the same result is accomplished, I shall consider obvious mechanical deviations as within the spirit and scope of my invention.

What I claim herein, and desire to secure by Letters Patent, is—

1. The combination of the body, the fixed front seat, the inclined strips secured to the inside of the body sides and extending under the fixed front seat to furnish supports for a rear seat under the front seat, the rear seat resting upon said strips, and means for locking it in either its upper or lower position.

2. The combination, substantially as specified, of the body A, the fixed front seat, the angle-iron bars B, secured in an inclined position to its inner side walls and extending under the front seat, the sliding seat C, supported upon said bars and adapted to slide to either its elevated position at the rear of the body or to its lower position under the seat, and means to retain the seat in its elevated position, whereby the vehicle is changed from a single-seat to a double-seat wagon, and vice versa.

3. The combination of the body having a front seat, inclined ways for a sliding rear seat, the rear seat adapted to slide upon said ways, and the reversible back for the rear seat, substantially as shown and described.

4. The combination of the body, the front seat, the inclined angle-iron ways for the rear seat, extending under the front seat and having its horizontal web notched, the sliding rear seat, and the catch D, pivoted to rear seat, having its end hooked to engage under the angle-ways and its edge adapted to enter the notch in said way to retain the seat in its upper position, substantially as shown and described.

CHAS. COMSTOCK.

Witnesses:
  GEO. J. MURRAY,
  FRANK S. DAVIS.